(12) United States Patent
Smith (10) Patent No.: US 9,488,307 B2
(45) Date of Patent: Nov. 8, 2016

(54) INFLOW PREVENTION COUPLER

(71) Applicant: IPS Corporation, Collierville, TN (US)

(72) Inventor: Bennie W. Smith, Southaven, MS (US)

(73) Assignee: IPS Corporation, Collierville, TN (US)

( * ) Notice: Subject to any disclaimer, the term of this patent is extended or adjusted under 35 U.S.C. 154(b) by 122 days.

(21) Appl. No.: 14/482,837

(22) Filed: Sep. 10, 2014

(65) Prior Publication Data

US 2015/0069749 A1  Mar. 12, 2015

Related U.S. Application Data

(60) Provisional application No. 61/875,948, filed on Sep. 10, 2013.

(51) Int. Cl.
| | | |
|---|---|---|
| *F16L 11/12* | (2006.01) | |
| *F16L 55/10* | (2006.01) | |
| *F16L 55/115* | (2006.01) | |

(52) U.S. Cl.
CPC .......... *F16L 55/1007* (2013.01); *F16L 55/115* (2013.01)

(58) Field of Classification Search
CPC ........... Y10T 403/11; Y10T 403/5733; F16L 2201/20; F16L 11/24; F16L 2201/60; F16L 37/60

USPC ................. 285/1–4, 304, 369–373, 417–419
See application file for complete search history.

(56) References Cited

U.S. PATENT DOCUMENTS

| | | | |
|---|---|---|---|
| 5,425,593 A * | 6/1995 | Buehler | ............................ 14/50 |
| 5,782,040 A * | 7/1998 | McCartan | ...................... 345/690 |
| 6,390,118 B1 * | 5/2002 | Mankins | ................. E03C 1/302 |
| | | | 137/15.14 |
| 6,408,887 B2 * | 6/2002 | Rahimzadeh | ............... 138/96 R |

* cited by examiner

*Primary Examiner* — Rodney Mintz
*Assistant Examiner* — Daniel Kenny
(74) *Attorney, Agent, or Firm* — Alston & Bird LLP (57) ABSTRACT

A coupler is described that precludes fluid communication between the first and second pipes attached on either side of the coupler. The coupler may be used in installations where a line branches off from a sewer main for future connection to a home or other building. The coupler includes a barrier wall located between first and second portions of the coupler, and the barrier wall precludes fluid communication between the first and second ends of the coupler. Moreover, the second portion defines an area of weakness that is designed to fail (e.g., flex or crack) when a failure force is applied near the second end, such as when an exposed (above-ground) portion of piping connected to the coupler is struck. In this way, the barrier wall and the first portion of the main wall can remain intact and continue to protect against entry of fluids into the sewer system.

14 Claims, 13 Drawing Sheets

INFLOW PREVENTION COUPLER

CROSS-REFERENCE TO RELATED APPLICATIONS

This application claims the benefit of U.S. Provisional Application No. 61/875,948 entitled "Inflow Prevention Device Coupling," filed Sep. 10, 2013, the contents of which are incorporated herein in their entirety.

FIELD OF THE INVENTION

The present invention relates generally to pipe coupling. More specifically, a coupler is described that prevents extraneous water from entering the sewer service line prior to its connection to a home or business.

BACKGROUND

Normally a sewer service line is extended above ground several feet so that it can be located when a tie-in to the intended structure is desired.

The portion of the pipe above the ground, however, can be, and often is, struck by mowing or construction equipment. Such an impact can damage or break off the pipe, depending on the force of the impact. In such cases, water (e.g., from rainfall or other sources) may enter the pipe and make its way into the sewer collection system.

BRIEF SUMMARY OF EXAMPLE EMBODIMENTS

Thus, there is a need for improved methods of protecting sewer service lines from the ingress of extraneous and unwanted water. Accordingly, embodiments of the present invention provide a device that is configured to be installed on a service line about 2 feet below finish ground grade. If and when the exposed pipe is struck and broken off or damaged, embodiments of the present invention are designed to continue to prevent inflow from entering the sewer collection system. In some embodiments, this coupler looks like any other polyvinyl chloride (PVC) coupler, except it is blanked off (e.g., blocked) in the middle to prevent water from flowing through it. Moreover, an area of weakness is provided that is configured to break above the blanked off area, such that in the event the exposed portion of piping is hit (e.g., by a lawnmower or construction equipment), the coupler will break in the area of weakness, and the blanked off area and portions of the coupler and piping below that area will remain intact and will continue to prevent the ingress of water into the service line.

In particular, a coupler is provided that is configured for connecting to a main sewage line. The coupler comprises a first end configured to be engaged with a first pipe, wherein the first pipe is in fluid communication with a main sewage line; a second end configured to be engaged with a second pipe; and a main wall extending between the first end and the second end and defining a body of the coupler. A barrier wall extends from an interior surface of the main wall between the first end and the second end. The barrier wall is configured to preclude fluid communication between the first and second ends.

The main wall may define a first portion between the first end and the barrier wall and may also define a second portion between the second end and the barrier wall. The main wall may include an area of weakness defined in the second portion, and the second portion may be configured to fail at the area of weakness upon application of a failure force proximate the second end, such that the barrier wall and the first portion of the main wall remain intact.

In some embodiments, the area of weakness may comprise a section of the main wall having reduced thickness. In other embodiments, the area of weakness may comprise at least one scored portion defined in an exterior surface of the main wall and/or at least one scored portion defined in the interior surface of the main wall.

In some cases, the first portion may define a first outer diameter and the second portion may define a second outer diameter, and the first and second outer diameters may be substantially the same. In other cases, the first outer diameter may be larger than the second outer diameter.

The first portion may define a first length and the second portion may define a second length, and the first length and the second length may be substantially the same in some cases. In other cases, the first length may be greater than the second length.

In some embodiments, an exterior surface of the main wall may include a visual indication of a direction of fluid flow. Additionally or alternatively, the coupler may include a locator component configured to be detectable without visual access to the coupler for determining a location of the coupler when the coupler is disposed underground. The locator component may, for example, comprise a metal ring configured to be secured to an exterior of the main wall, or the locator component may comprise a metal ring embedded in the main wall. In still other cases, the locator component may be integral to the main wall. For example, the locator component may comprise a metal-detectable resin in some cases.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the coupler, piping, sewer service line, and associated systems are not shown in one or more of the figures for clarity and to facilitate explanation of embodiments of the present invention.

As used herein, the terms "bottom," "top," "upper," "lower," "interior," "exterior," and/or similar terms are used for ease of explanation and refer generally to the position of certain components or portions of the components of embodiments of the described invention in the installed configuration (e.g., in an operational configuration, such as installed in the ground on a sewer service line). It is understood that such terms are not used in any absolute sense. Moreover, although the examples used below refer primarily to couplers for use on piping that connects to a sewer service line for construction of houses or other buildings, embodiments of the present invention may further be applicable to piping systems for other applications and in other contexts (e.g., for connecting to a potable water supply line, etc.).

Embodiments of the present invention provide a pipe coupler which prevents extraneous water from entering the sewer service line prior to its connection to a home or business. In some embodiments, such as those shown in FIGS. 1-9, the coupler may look like any other PVC coupler, except that it is blanked off (e.g., blocked) in the middle to prevent water from flowing through it.

In some embodiments, the coupler may be recognized by its bright color and the depiction of a flow directional arrow on an exterior surface of the coupler, which may help prevent a plumber from tying the structure's sewer line (e.g., the sewer line of the house or other building under construction) to the service pipe above the coupler, as this would result in no flow of sewage from the building to the main sewer service line, and may further help the sewer main contractor from installing the coupler upside down, as described in greater detail below. Additionally, in some embodiments, the coupler may be designed with a thin walled section above the blank in the coupler, such that when the exposed pipe is struck, the pipe shears or bends at this section of the pipe and prevents the force that the exposed pipe experiences from transferring down to the Wye connecting the service pipe to the sewer main. If such force is transferred downward, towards the Wye, the Wye may be damaged, which may lead to cracks or open joints. Such damage may be very expensive to repair and may require digging down to the sewer main, which may further cause damage to (and require subsequent repair of) any roads or other structures located above the area where the sewer main was damaged, such as when the sewer main is located in the street.

Embodiments of the present invention may thus be required the world over, as inflow into treatment facilities (e.g., caused by unwanted water entering into the sewage system such as through cracks or breaks in service lines as described above) increases the volume of waste water being treated drastically and sometimes leads to loss of the biological medium. Open sewer service lines are one of the sources that can be eliminated relatively inexpensively with this device. Also, the cap that is normally placed on top of the exposed sewer pipe in conventional systems to prevent inflow would not be necessary if this coupler device is used, thereby saving additional money.

Figure 1:
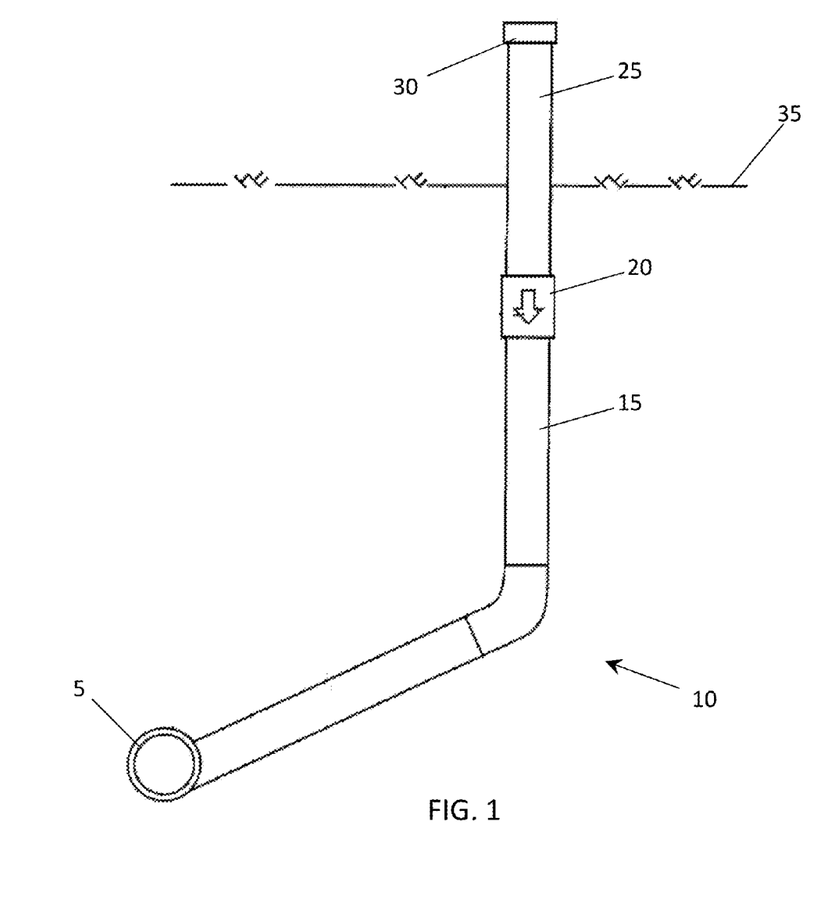
FIG. 1 is a schematic representation of a coupler tied to a sewer pipe according to an embodiment of the present invention.

Referring now to FIG. 1, a pipe installation is shown (not to scale) in which a main sewage line 5 has been prepared for providing sewage service to a future building (e.g., a house or office building). As shown, one or more pipes and connectors (collectively referenced as a branch line 10) tie into a main sewage line 5 at one end and are available for future connection to the building at the other end. According to embodiments of the invention, a first pipe 15 is installed distally of the main sewage line 5, such as to form the connecting end of the branch line 10. Embodiments of the coupler 20 are configured to be connected to the distal end of the first pipe 15 on one side and to a second pipe 25 on the other side. In some cases, a cap 30 may be provided on the exposed distal end of the second pipe 25 to prevent water (such as from rainfall) or other fluids from entering the second pipe.

According to embodiments of the invention and as mentioned above, however, the coupler 20 itself is configured to preclude fluid communication between the second and first pipes 25, 15, as will be described in greater detail below. At least a portion of the second pipe 25 may be buried in the ground 35, and in some cases may be placed at a depth of approximately 2 feet or more, with the coupler 20 and the rest of the branch line 10 extending from the main sewage line 5 also buried in the ground, beneath the second pipe.

Because the coupler 20 according to embodiments of the invention is configured to prevent the flow of water from the second pipe 25 to the first pipe 15, even if the exposed (e.g., above-ground) portions of the second pipe 25 are broken off or damaged, such as through impact with a lawnmower or construction equipment, the coupler may still serve to block the ingress of water into the main sewage line 5. Moreover, embodiments of the coupler 20 are configured to provide an area of weakness, described below, that is designed to allow the coupler 20 and/or the second pipe 25 to fail in a way that maintains the ability of the coupler to prevent water from entering the first pipe 15. In this way, even if the second pipe 25 is hit and is broken off or damaged, the coupler 20 will still be able to prevent unwanted water from entering the main sewage line 5.

Figure 7:
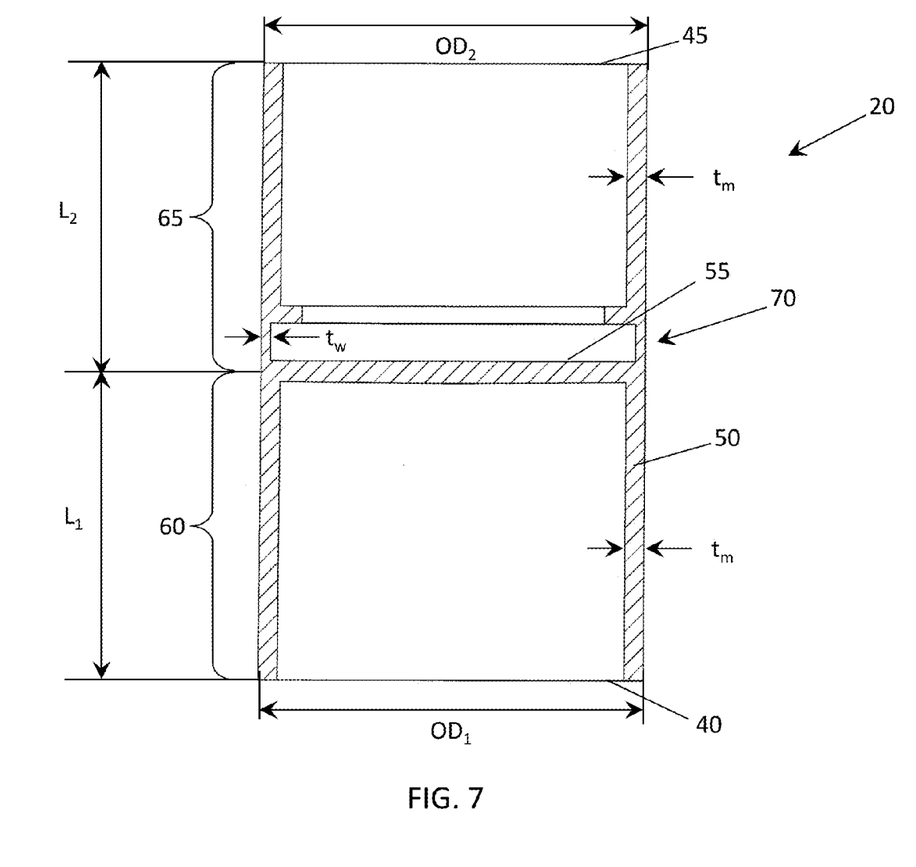
FIG. 7 is a cross-sectional view of the coupler of taken along line A-A of FIG. 6.
Figure 8:
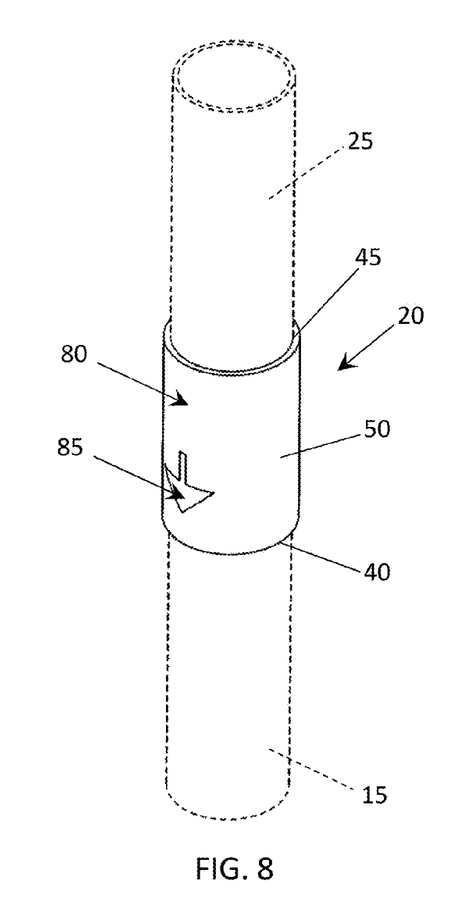
FIG. 8 is a right-side perspective view of the coupler joining two pipes according to an embodiment of the present invention.
Figure 9:
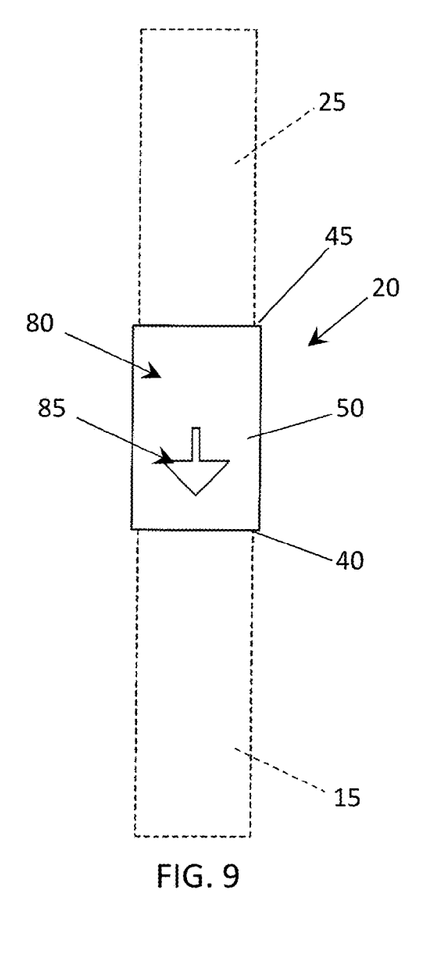
FIG. 9 is a front-side view of the coupler joining two pipes according to an embodiment of the present invention.
Figure 10:
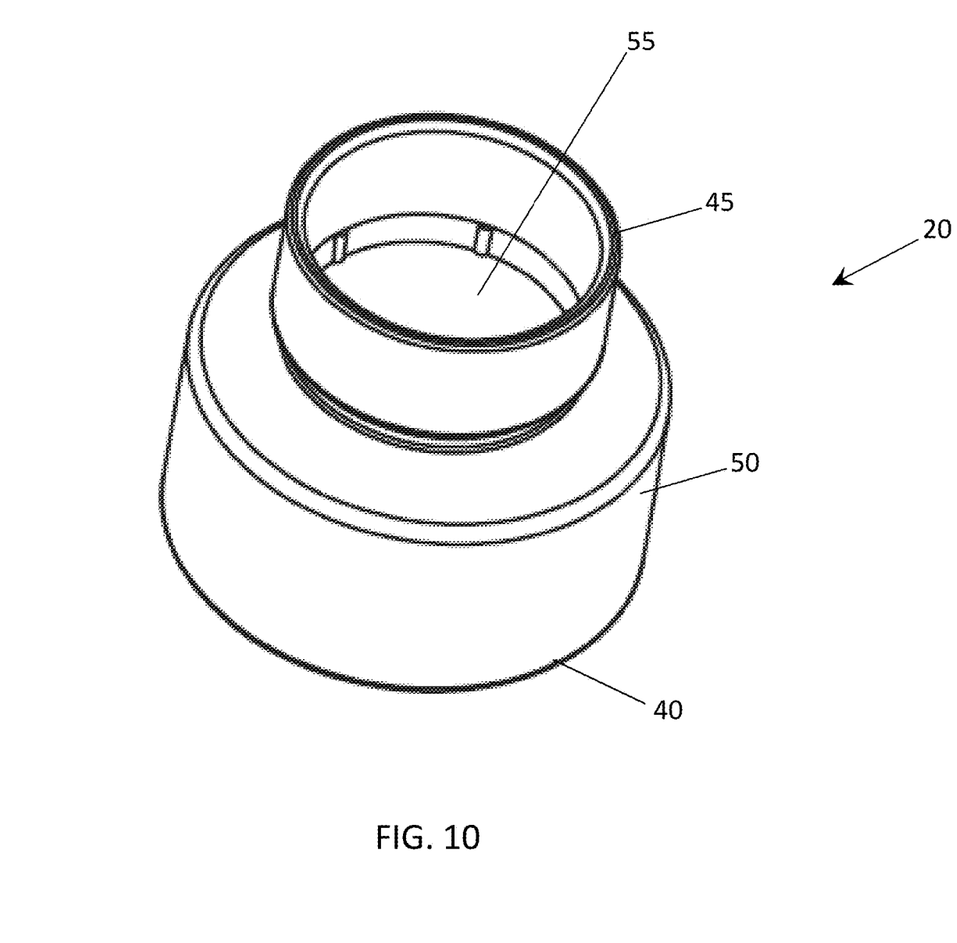
FIG. 10 is a perspective view of a coupler according to another embodiment of the present invention.
Figure 11:
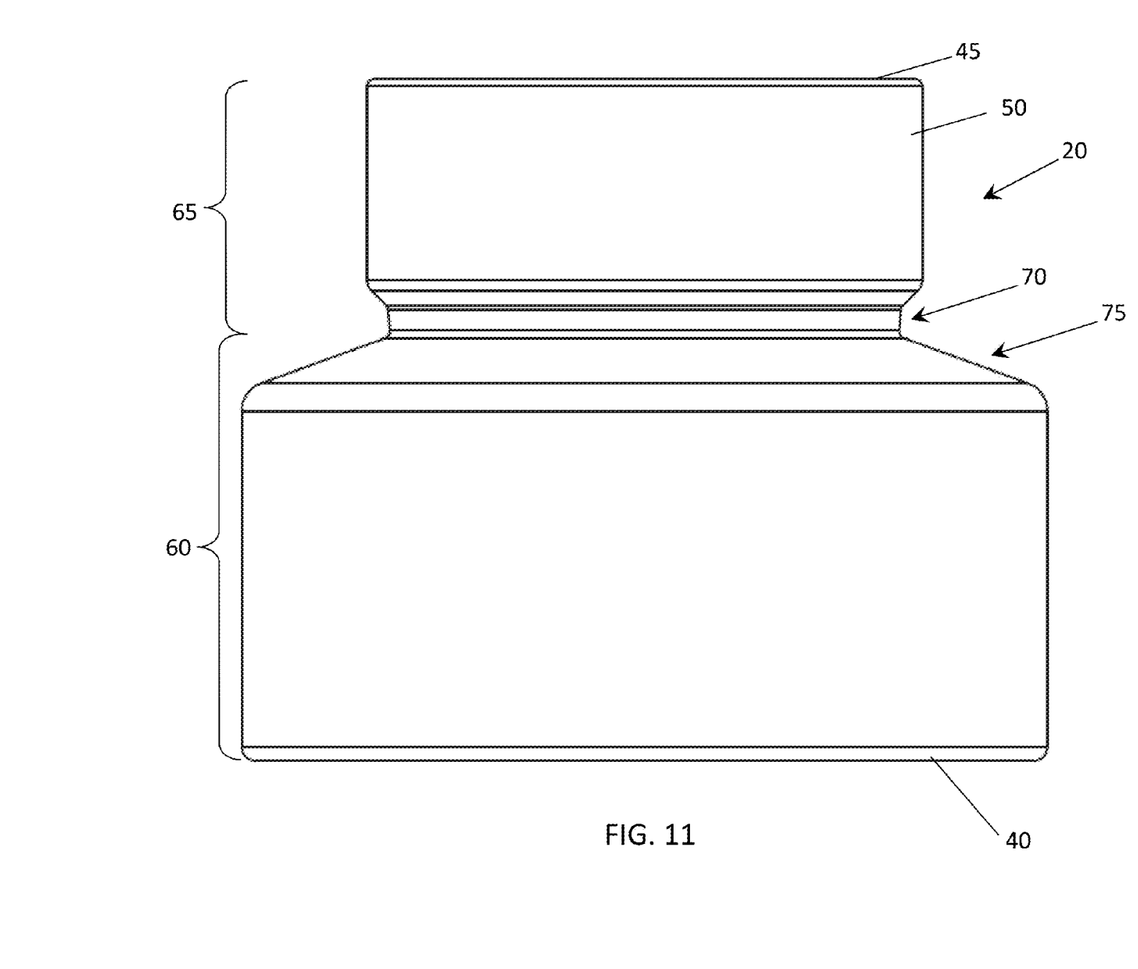
FIG. 11 is front plan view of the coupler of FIG. 10.

Turning now to FIGS. 2-9, one embodiment of the coupler 20 is illustrated. In FIGS. 2-7, the coupler 20 is shown alone for ease of explanation. In FIGS. 8 and 9, the coupler 20 is shown connected to the first and second pipes 15, 25. Another embodiment of the coupler 20 is illustrated in FIGS. 10-13, as will be described below.

Figure 2:
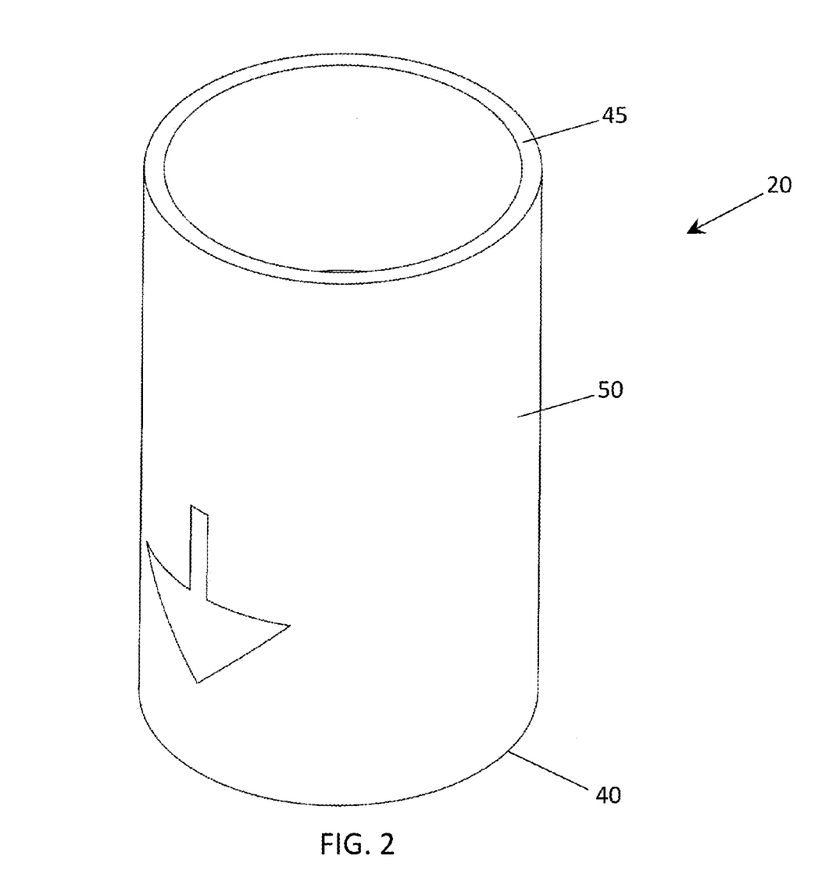
FIG. 2 is a right-side perspective view of the coupler according to an embodiment of the present invention.
Figure 3:
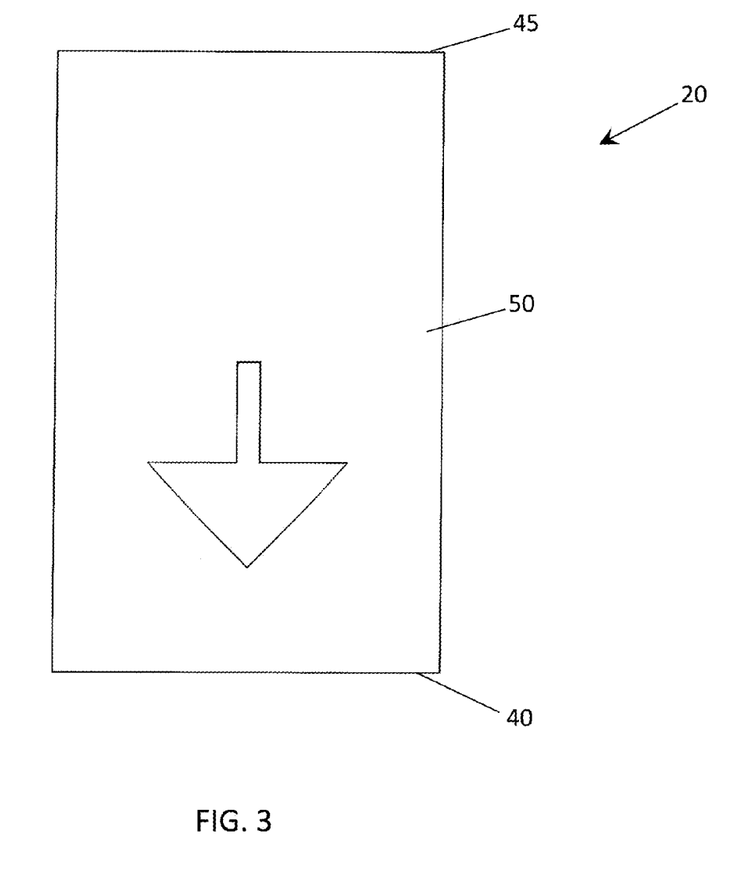
FIG. 3 is a front-side view of the coupler according to an embodiment of the present invention.
Figure 4:
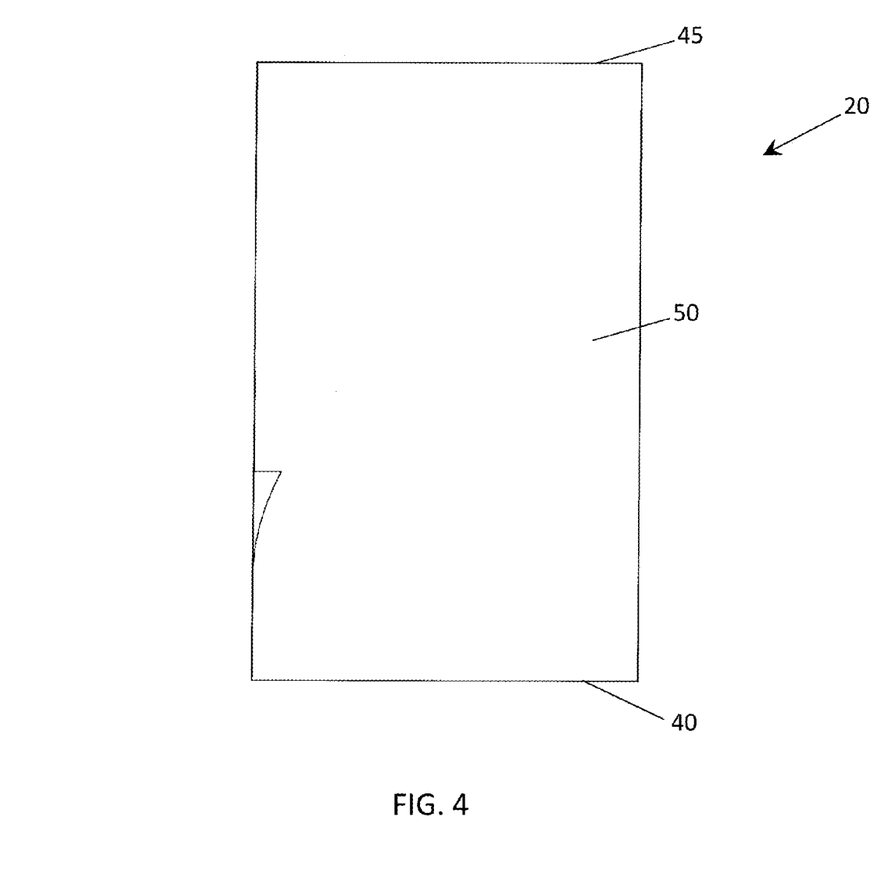
FIG. 4 is a right-side view of the coupler according to an embodiment of the present invention.
Figure 5:
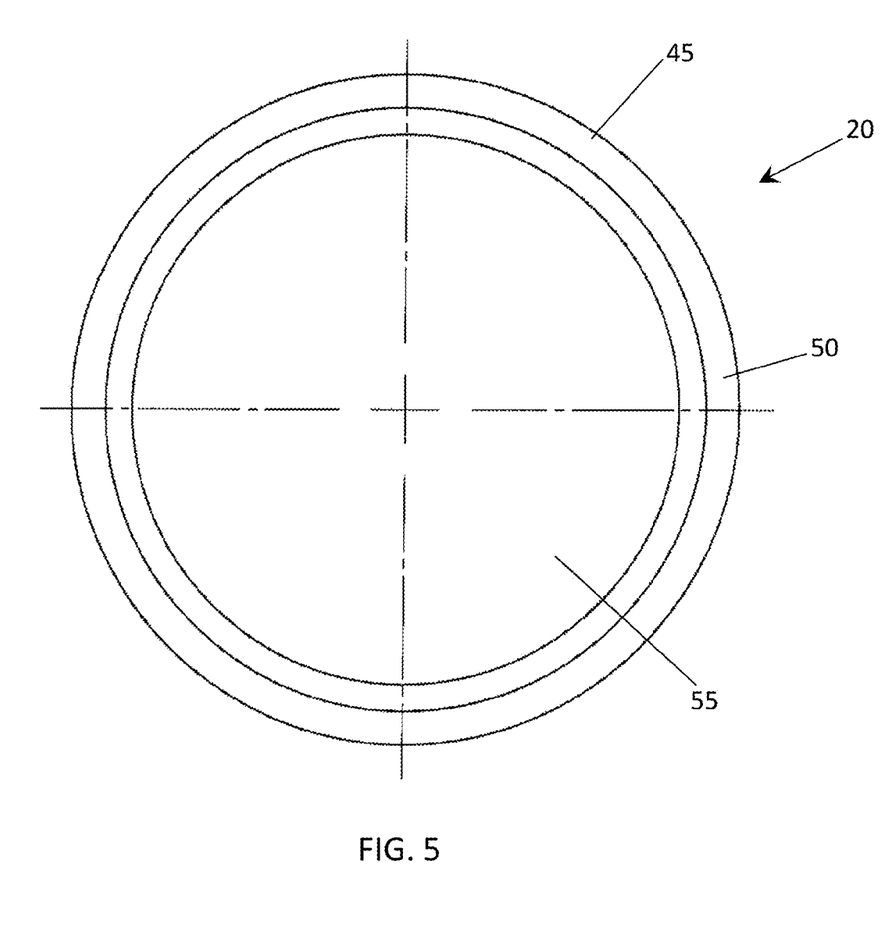
FIG. 5 is a top-side view of the coupler according to an embodiment of the present invention.
Figure 6:
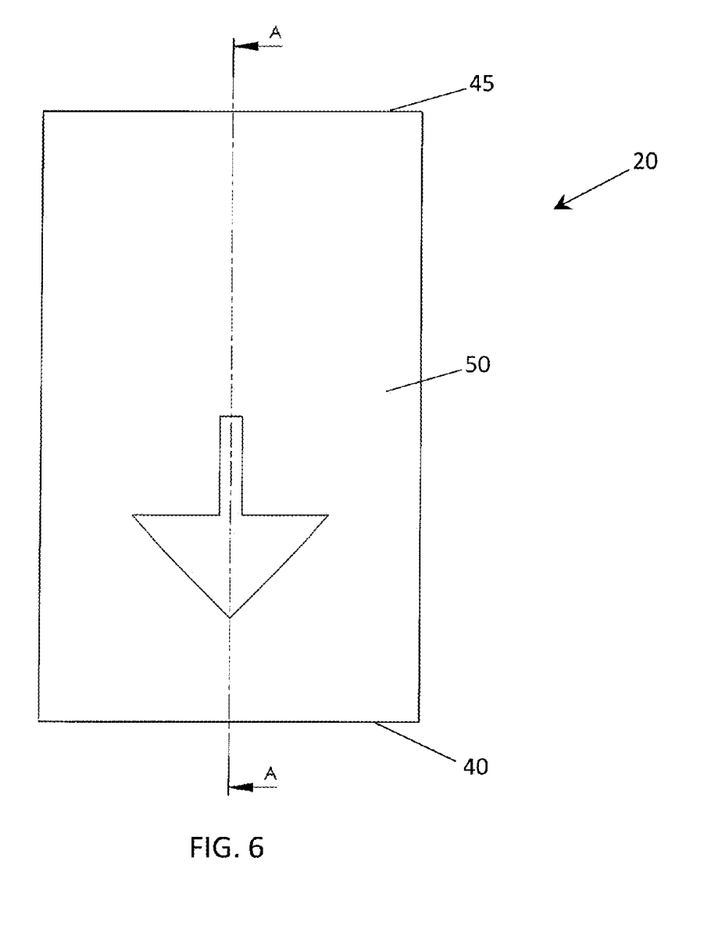
FIG. 6 is a front-side view of the coupler according to an embodiment of the present invention.

According to some embodiments, with reference to FIG. 2, for example, the coupler 20 may include a first end 40 configured to be engaged with the first pipe 15 (shown in FIGS. 1, 8, and 9) and a second end 45 configured to be engaged with the second pipe 25. As noted above, the first pipe 15 may be in fluid communication with the main sewage line 5, shown in FIG. 1.

The coupler 20 may further include a main wall 50 that extends between the first end 40 and the second end 45 and defines a body of the coupler. A barrier wall 55 may be provided that is configured to preclude fluid communication between the second and first ends 45, 40 (shown in FIGS. 5 and 7). In this regard, the barrier wall 55 may extend from an interior surface of the main wall 50 (best illustrated in FIG. 7) and may be disposed between the first end 40 and the second end 45, such as, for example, in a central area of the coupler 20, as shown.

With reference to FIG. 7, which shows a cross-section of the coupler 20, the main wall 50 may thus define a first portion 60 between the first end 40 and the barrier wall 55 and may also define a second portion 65 between the second end 45 and the barrier wall 55. The main wall 50 may include an area of weakness 70 defined in the second portion 65. In this regard, the second portion 65 may be configured to fail (e.g., fracture, buckle, crack, flex, or otherwise experience structural affectations, which may or may not be permanent) at the area of weakness 70 upon application of a failure force proximate the second end 45, such that the barrier wall 55 and the first portion 60 of the main wall 50 remain intact. The failure force may be, for example, a force applied to the second pipe 25 (FIG. 1), such as through accidental impact with a lawnmower or other moving vehicle, that is transmitted downward to the coupler 20. In other words, instead of allowing the failure force to be transmitted farther down the coupler 20 to the first pipe 15 or other portions of the branch line 10, the area of weakness 70 is configured to absorb the failure force by failing in a more controlled manner distally of the barrier wall 55 (with respect to the main sewage line 5), such that more proximal portions of the piping remain intact and fluid continues to be blocked (by the barrier wall 55) from entry into the main sewage line 5.

The area of weakness 70 may be provided in various ways, such that the portion of the main wall 50 corresponding to the location of the area of weakness is structurally not as strong (and can thus withstand less applied force) than other areas of the main wall. In some cases, for example, the area of weakness 70 may comprise a section of the main wall that has a reduced thickness. In FIG. 7, for example, the area of weakness 70 has a thickness $t_w$ that is less than the thickness $t_m$ of the main wall in other places.

In other cases, however, the area of weakness 70 may comprise at least one scored portion defined in an exterior surface of the main wall 50. For example, one or more score lines (not shown) may be etched in the exterior surface of the main wall 50 to weaken the main wall in the scored portion. Additionally or alternatively, as another example, the area of weakness 70 may comprise at least one scored portion defined in the interior surface of the main wall 50, such as when one or more score lines (not shown) are etched in the interior surface of the main wall 50 to weaken the main wall in the scored portion.

With reference to FIG. 7, the first portion 60 may define a first outer diameter $OD_1$, and the second portion 65 may define a second outer diameter $OD_2$. In some embodiments, such as the embodiments shown in FIGS. 1-9, the first and second outer diameters $OD_1$ and $OD_2$ may be substantially the same (e.g., the diameters may be the same, notwithstanding differences according to engineering tolerances that are acceptable to those skilled in the relevant arts).

Figure 12:
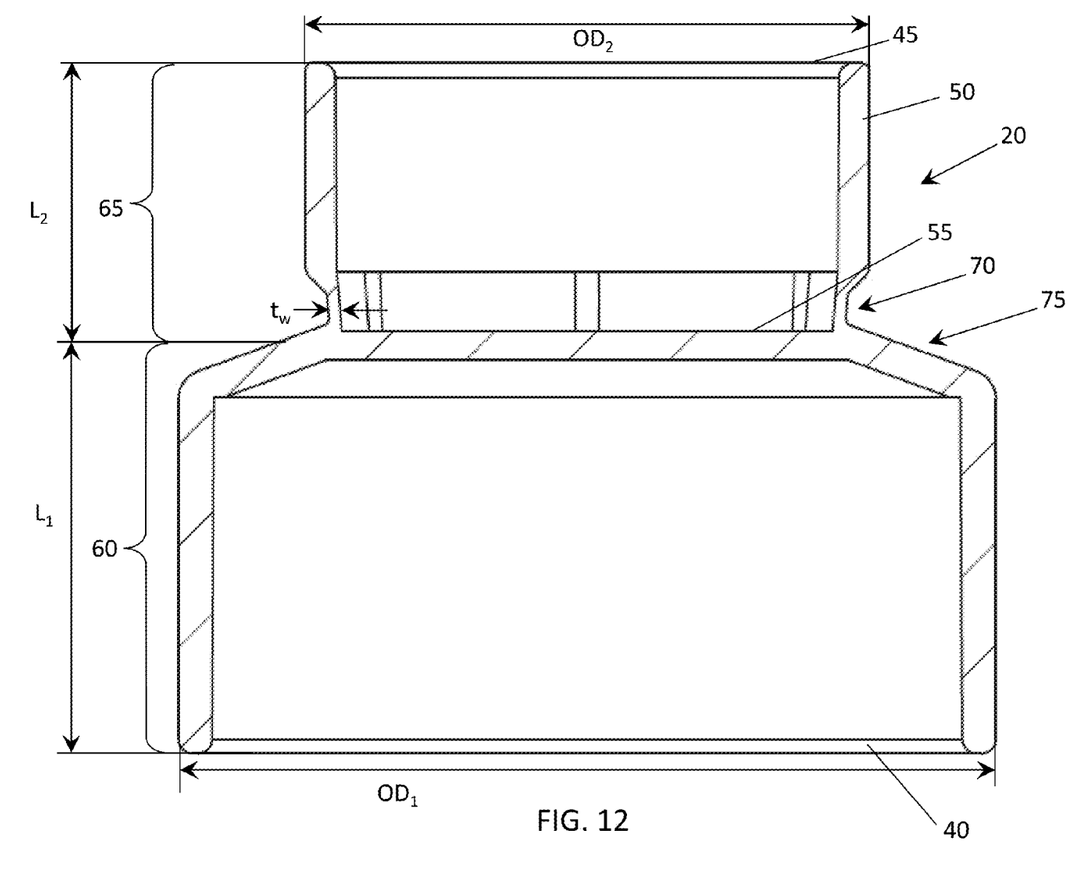
FIG. 12 is a cross-sectional view of the coupler of FIG. 10.

In other embodiments, such as shown in FIGS. 10-13, and with particular reference to FIG. 12, the first outer diameter $OD_1$ may be larger than the second outer diameter $OD_2$. This may be the case, for example, in scenarios in which the first pipe 15 (shown in FIG. 1) has a larger diameter than the second pipe 25. As an example, the first outer diameter $OD_1$ of the first portion 60 may be between approximately 6 inches and 7 inches wide, and the second outer diameter $OD_2$ of the second portion 65 may be between approximately 4 inches and 5 inches wide. In such embodiments, the first portion 60 may further include a tapered section 75 to effect a transition from the first outer diameter $OD_1$ to the second outer diameter $OD_2$.

The first and second portions 60, 65 may be different in other respects, as well. For example, the first portion 60 may define a first length $L_1$ and the second portion 65 may define a second length the length $L_2$. With reference to FIG. 7, in some cases, the first length $L_1$ of the first portion 60 and the second length $L_2$ of the second portion 65 may be substantially the same. In other cases, however, the first length $L_1$ of the first portion 60 may be greater than the second length $L_2$ of the second portion 65.

Referring again to FIGS. 8 and 9, in some embodiments, an exterior surface 80 of the main wall 50 of the coupler 20 may include a visual indication 85 of a direction of fluid flow. The visual indication 85 may, for example, be the depiction of an arrow (as shown), and an installer of the coupler 20 may use the visual indication 85 to properly orient the coupler 20 with respect to the main sewage line 5 and the rest of the system, such that the area of weakness 70 is properly positioned "above" the barrier wall 50, with respect to the location of the main sewage line 5, as shown in FIG. 1. In still other embodiments, different colors may be used to visually differentiate couplers 20 with a barrier wall 55 from other types of couplers. For example, in some cases, couplers 20 in accordance with embodiments of the present invention may be visually distinguished using a red color applied to the exterior surface 80 of the coupler 20.

Figure 13:
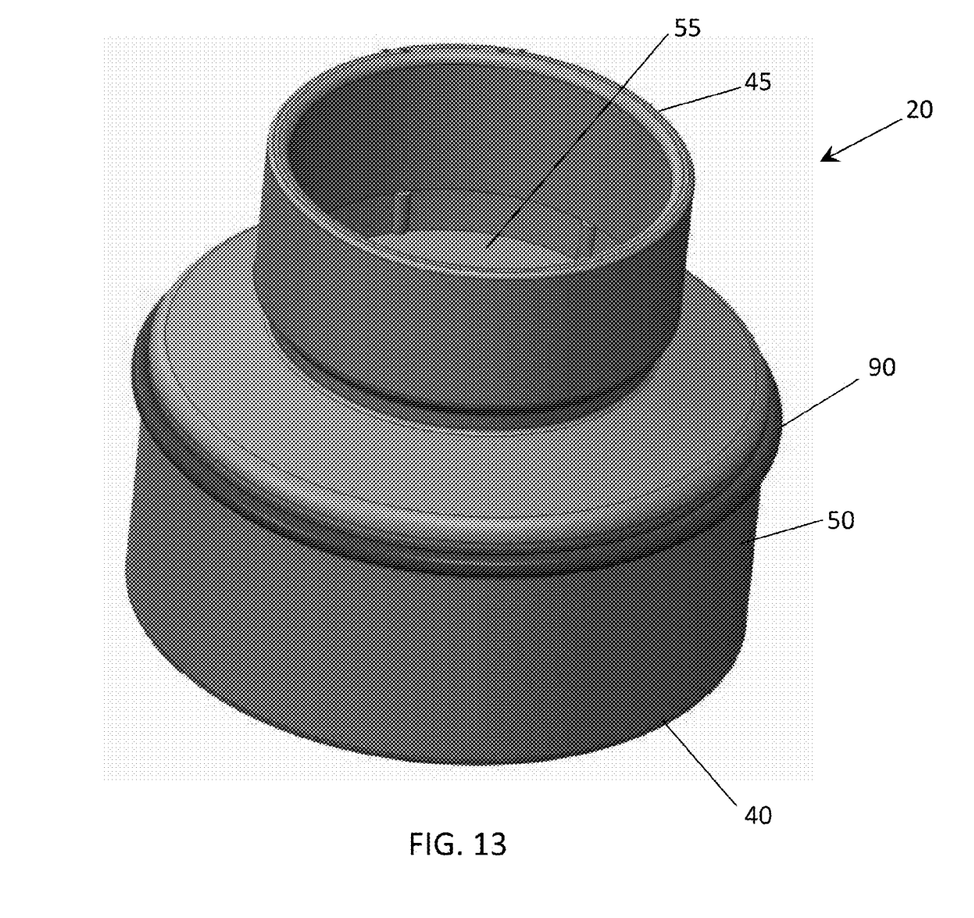
FIG. 13 is a perspective view of a coupler with a locator component according to another embodiment of the present invention.

Turning to FIG. 13, in some embodiments, the coupler 20 may further comprise a locator component 90 that is configured to be detectable without visual access to the coupler for determining a location of the coupler when the coupler is disposed underground. The locator component 90 may, for example, comprise a metal material, such that a location of the coupler 20 (which is underground when installed) could be detected using a metal detector. In FIG. 13, for example, an embodiment is depicted in which the locator component 90 comprises a metal ring. In some cases, the locator component 90 comprises a metal ring that is configured to be secured to an exterior 80 of the main wall 50, such as a metal sleeve that can be snapped onto the exterior of the main wall. In other cases, however, the locator component 90 may comprise a metal ring that is embedded in the main wall 50, such as during a molding process used to make the coupler 20. In still other cases, the locator component 90 may be integral to the main wall 50, such as when the locator component includes a metal-detectable resin that comprises or is included with the material used to construct the coupler 20.

In some embodiments, the coupler 20 itself may be molded out of various materials, including rigid Acrylonitrile Butadiene Styrene (ABS), PVC, or other materials. In some cases, the coupler 20 may be molded from a flexible ethylene propylene diene monomer (EPDM) rubber or a flexible PVC or thermoplastic elastomer (TPE)-type of material. In such cases, in which the coupler 20 is designed to be flexible, the area of weakness may be designed to fail by flexing, rather than cracking or otherwise breaking. By flexing at the area of weakness, portions of the system located underground, below the barrier wall of the coupler, may still be protected against breaking, and the barrier wall can continue to protect against water or other liquids entering the main sewage line, as described above.

As noted above, the structures and components depicted in the figures have been simplified for clarity and ease of explanation. For example, features may be included in some embodiments of the coupler that are not described above and/or not shown in the figures for ease of explanation, but which may facilitate manufacture, installation, sale, or practicability of use. In addition, many other modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Moreover, steps in the methods described above may occur in any order and are not limited to the order described above.

What is claimed is:

1. A coupler configured for connecting to a main sewage line, the coupler comprising:
   a first end configured to be engaged with a first pipe, wherein the first pipe is in fluid communication with a main sewage line;
   a second end configured to be engaged with a second pipe;
   a main wall extending between the first end and the second end and defining a body of the coupler; and
   a single barrier wall extending from an interior surface of the main wall between the first end and the second end, wherein the barrier wall is configured to preclude fluid communication between the first and second ends,
   wherein the main wall defines a first portion between the first end and the barrier wall,
   wherein the main wall defines a second portion between the second end and the barrier wall,
   wherein the main wall includes an area of weakness defined in the second portion, and
   wherein the single barrier wall is located below the area of weakness, and wherein the second portion is configured to fail at the area of weakness upon application of a failure force proximate the second end, such that the barrier wall and the first portion of the main wall remain intact.

2. The coupler of claim 1, wherein the area of weakness comprises a section of the main wall having reduced thickness.

3. The coupler of claim 1, wherein the area of weakness comprises at least one scored portion defined in an exterior surface of the main wall.

4. The coupler of claim 1, wherein the area of weakness comprises at least one scored portion defined in the interior surface of the main wall.

5. The coupler of claim 1, wherein the first portion defines a first outer diameter and the second portion defines a second outer diameter, wherein the first and second outer diameters are substantially the same.

6. The coupler of claim 1, wherein the first portion defines a first outer diameter and the second portion defines a second outer diameter, wherein the first outer diameter is larger than the second outer diameter.

7. The coupler of claim 1, wherein the first portion defines a first length and the second portion defines a second length, wherein the first length and the second length are substantially the same.

8. The coupler of claim 1, wherein the first portion defines a first length and the second portion defines a second length, wherein the first length is greater than the second length.

9. The coupler of claim 1, wherein an exterior surface of the main wall includes a visual indication of a direction of fluid flow.

10. The coupler of claim 1 further comprising a locator component configured to be detectable without visual access to the coupler for determining a location of the coupler when the coupler is disposed underground.

11. The coupler of claim 10, wherein the locator component comprises a metal ring configured to be secured to an exterior of the main wall.

12. The coupler of claim 10, wherein the locator component comprises a metal ring embedded in the main wall.

13. The coupler of claim 10, wherein the locator component is integral to the main wall.

14. The coupler of claim 13, wherein the locator component comprises a metal-detectable resin.

* * * * *